(12) United States Patent
Boykov et al.

(10) Patent No.: US 6,973,212 B2
(45) Date of Patent: Dec. 6, 2005

(54) GRAPH CUTS FOR BINARY SEGMENTATION OF N-DIMENSIONAL IMAGES FROM OBJECT AND BACKGROUND SEEDS

(75) Inventors: Yuri Boykov, Princeton, NJ (US); Marie-Pierre Jolly, Hillsborough, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 578 days.

(21) Appl. No.: 09/943,035

(22) Filed: Aug. 30, 2001

(65) Prior Publication Data

US 2002/0048401 A1 Apr. 25, 2002

Related U.S. Application Data

(60) Provisional application No. 60/229,937, filed on Sep. 1, 2000.

(51) Int. Cl.$^7$ .............................................. G06K 9/34
(52) U.S. Cl. ..................................... 382/173; 382/225
(58) Field of Search ............................... 382/154, 173, 382/180, 224–226, 285

(56) References Cited

U.S. PATENT DOCUMENTS

| | | | |
|---|---|---|---|
| 4,905,148 A | * | 2/1990 | Crawford ..................... 382/131 |
| 6,744,923 B1 | * | 6/2004 | Zabih et al. ................. 382/226 |
| 2003/0206652 A1 | * | 11/2003 | Nister ........................ 382/154 |

OTHER PUBLICATIONS

Snow et al. "Exact voxel occupancy with graph cuts." Proceedings of the IEEE Conference on Computer Vision and Pattern Recognition, vol. 1, Jun. 2000, pp. 345-352.*

Bonneville et al. "Graph cut: application to Bayesian emission tomography reconstruction." Proceedings of the International Conference on Image Analysis and Processing, Sep. 1999, pp. 1184-1189.*

Amir A. Amini, Terry E. Weymouth, and Ramesh C. Jain. Using dynamic programming for solving variational problems in vision. IEEE Transactions on Pattern Analysis and Machine Intelligence, 12(9):855-867, Sep. 1990.

Y. Boykov, O. Veksler, and R. Zabih. Markov random fields with efficient approximations. In IEEE Conference on Computer Vision and Pattern Recognition, pp. 648-655, 1998.

(Continued)

*Primary Examiner*—Vikkram Bali
*Assistant Examiner*—Colin LaRose
(74) *Attorney, Agent, or Firm*—Donald B. Paschburg; F. Chau & Associates LLC

(57) ABSTRACT

Disclosed is a method of segmenting one or more objects from one or more backgrounds in an image, the method comprising defining a plurality of image nodes, each said image node corresponding to one or more pixels of said image, connecting pairs of adjacent nodes with n-links, each said n-link weighted with an n-link cost, defining a source node, defining a sink node, defining one or more object seeds, said object seeds corresponding to image nodes within said objects, defining one or more background seeds, said background seeds corresponding to image nodes within said backgrounds, connecting said source node with each said object seed with a plurality of t-links, connecting said sink node with each said background seed with a plurality of t-links, wherein each said t-links is weighted with a t-link cost, and calculating a segmentation cut having the smallest total cost of all cuts separating said source from said sink, wherein said total cost of each said cut is defined as the sum of the costs of all said n-links and t-links that each said cut severs.

20 Claims, 5 Drawing Sheets

OTHER PUBLICATIONS

Laurent D. Cohen. On active contour models and balloons. Computer Vision, Graphics, and Image Processing: Image Understanding, 53(2) :211-218, 1991.

Laurent D. Cohen and Isaac Cohen. Finite element methods for active contour models and balloons for 2-d and 3-d images. IEEE Transactions on Pattern Analysis and Machine Intelligence, 15(II):1131-1147, Nov. 1993.

Irigemar J. Cox, Satish B. Rao, and Yu Zhong. "ratio regions": a technique for image segmentation. In International Conference on Pattern Recognition, vol. II, pp. 557-564. 1996.

Marie-Pierre Dubuisson-Jolly, Cheng-Chung Liang, and Alok Gupta. Optimal polyline tracking for artery motion compensation in coronary angiography. In International Conference on Computer Vision, pp. 414-419, 1998.

L. Ford and D. Fulkerson. Flows in Networks. Princeton University Press, 1962.

Davi Geiger, Alok Gupta, Luiz A. Costa, and John Viontzos. Dynamic programming for detecting, tracking, and matching deformable contours. IEEE Transactions on Pattern Analysis and Machine Intelligence, 17(3):294-402, Mar. 1995.

A. Goldberg and R. Tarjan. A new approach to the maximum flow problem. Journal of the Association for Computing Machinery, 35(4):921-940, Oct. 1988.

D. Greig, B. Porteo:-ancl A. Seheult. Exact maximum a posteriori estimation for binary images. Journal of the Royal Statistical Society, Series B, 51(2):271-279, 1989.

Robert M. Haralick and Linda G. Shapiro. Computer and Robot Vision. Addison-Wesley Publishing Company, 1992.

H. Islilkawa and D. Geiger. Segmentation by grouping junctions. In IEEE Conference on Computer Vision and Pattern Recognition, pp. 125-131, 1998.

Ian H. Jermyn and Hiroshi Ishikawa. Globally optimal regions and boundaries. In International Conference on Computer Vision, vol. II, pp. 904-910, 1999.

M. Kass, A. Witkin, and D. Terzolpoulos. Snakes: Active contour models. International Journal of Computer Vision, 2:321-331, 1988.

E. N. Mortensen and W. A. Barrett. Interactive segmentation with intelligent scissors, Graphical Models and Image Processing, 60:349-384, 1998.

Thomas O'Donnell, Marie-Pierre Dubuisson-Jolly; and Alok Gupta. A cooperative framework for segmentation using 2d active contours and 3d hybrid models as applied to branch cylindrical structures. In International Conference on Computer Vision, pp. 454-459, 1998.

Jianbo Shi and Jitendra Malik. Normalized cuts and image segmentation. In IEEE Conference on Computer Vision and Pattern Recognition, pp. 731-737, 1997.

D. J. Williams and M. Shah. A fast algorithm for active contours and curvature estimation. Computer Vision, Graphics, and Image Processing: Image Understanding, 55(I):14-26, 1992.

Zhenyu Wu and Richard Leahy. An optimal graph theoretic approach to data clustering: Theory and its application to image segmentation. IEEE Transactions on Pattern Analysis and Machine Intelligenece, 15(II):1101-1113, Nov. 1993.

Alan Yuille and P. Hallinan. Deformable templates. In Andrew Blake and Alan Yuille, editors, Active Vision, pp. 20-38. MIT Press, 1992.

Song Chun Zhu and Alan Yuille. Region competition: Unifying snakes, region growing, and Bayes/MDL for multiband image segmentation. IEEE Transactions on Pattern Analysis and Machine Intelligence, 18(9) :884-900, Sep. 1996.

Y. Boykov and V. Kolomogorov, *An experimental comparison of min-cut/max-flow algorithms for energy minimization in vision*, $3^{rd}$ International Workshop on Energy Minimization Methods in Computer Vision and Pattern Recognition (EMMCVPR), Springer-Verlag (Sep. 2001).

Y. Boykov & M-P. Jolly, *Interactive graph cuts for optical boundary & region segmentation of objects in n-D images*, Proceedings of the Interational Conference on Computer Vision, Vancouver, Canada, vol. 1, pp. 105-112 (2001).

* cited by examiner

GRAPH CUTS FOR BINARY SEGMENTATION OF N-DIMENSIONAL IMAGES FROM OBJECT AND BACKGROUND SEEDS

This application claims the benefit of a provisional U.S. application, U.S. Ser. No. 60/229,937, filed Sep. 1, 2000.

FIELD OF THE INVENTION

This invention relates to a method of image segmentation based on graph cuts that is useful for separating an object of interest in an image from the background of the image.

DISCUSSION OF THE RELATED ART

Many real life applications can strongly benefit from methods that can reliably segment out objects in images by finding their precise boundaries. One important example is medical diagnosis from 2-D and 3-D MR or CT images used by doctors to investigate various organs of their patients. Four-dimensional medical images containing information about 3-D volumes moving in time are also known. These images usually present to the viewer overwhelming quantities of information such as to reveal a need for tools that would enable the viewer to focus on relevant parts of these images. Precise segmentation of organs would allow accurate measurement, simplify visualization and, consequently, make the diagnosis more reliable.

There are a large number of contour-based segmentation tools developed for 2-D images, such as "snakes", disclosed in Kass et al., *Snakes: Active contour models*, International Journal of Computer Vision, 2:321–331 (1988), and L. D. Cohen, *On active contour models and balloons*, Computer Vision, Graphics, and Image Processing: Image Understanding, 53(2):211–218 (1991); "deformable templates", disclosed in Yuille et al., Deformable templates, Active Vision, pages 20–38, MIT Press (1992); and "shortest path" computations as disclosed in Mortensen et al., *Interactive segmentation with intelligent scissors*, Graphical Models and Image Processing, 60:349–384 (1998) and Dubuisson-Jolly et al., *Optimal polyline tracking for artery motion compensation in coronary angiography*, International Conference on Computer Vision, pages 414–419, (1998). Most of these methods can not be easily generalized to images of higher dimensions. To locate a boundary of an object in a 2-D image, these methods rely on lines ("1-D contours") that can be globally optimized by, for example, using dynamic programming, such as described in Amini et al., *Using dynamic programming for solving variational problems in vision*, IEEE Transactions on Pattern Analysis and Machine Intelligence, 12(9):855–867 (September 1990); Williams et al., *A fast algorithm for active contours and curvature estimation*, Computer Vision, Graphics, and Image Processing: Image Understanding, 55(1):14–26 (1992); and Geiger et al., *Dynamic programming for detecting, tracking, and matching deformable contours*, IEEE Transactions on Pattern Analysis and Machine Intelligence, 17(3):294–402 (March 1995). In 3-D images the object boundaries are surfaces and the standard dynamic programming or path search methods can not be applied directly. Computing an optimal shape for a deformable template of a boundary becomes highly intractable even in 3-D, not to mention 4-D or higher dimensional images. Gradient descent optimization or variational calculus methods such as are described in Cohen, supra, and Cohen and Cohen, *Finite element methods for active contour models and balloons for 2-D and 3-D images*, IEEE Transactions on Pattern Analysis and Machine Intelligence, 15(11):1131–1147, (November 1993) can still be applied but they produce only a local minimum. Thus, the segmentation results may not reflect the global properties of the original model of deformable contour. An alternative approach is to segment each of the 2-D slices of a 3-D image separately and then glue the pieces together). The major drawback of this approach is that the boundaries in each slice are independent. The segmentation information is not propagated within the 3-D image volume and the result can be spatially incoherent. A 3-D hybrid model is disclosed in O'Donnell et al., *A cooperative framework for segmentation using 2d active contours and 3d hybrid models as applied to branching cylindrical structures*, International Conference on Computer Vision, pages 454–459 (1998) to smooth the results and to enforce coherence between the slices. In this case the solution to the model fitting is computed through the gradient descent and, thus, may get stuck at a local minimum.

Alternatively, there are many region-based techniques for image segmentation: region growing, split-and-merge, and others [e.g., see Chapter 10 in Haralick et al., *Computer and Robot Vision*, Addison-Wesley Publishing Company (1992)]. The general feature of these methods is that they build the segmentation based on information inside the segments rather than at the boundaries. For example, one can grow the object segment from given "seeds" by adding neighboring pixels (or voxels, for 3-D images) that are "similar" to whatever is already inside. These methods can easily deal with images of any dimensions. However, the main limitation of many region-based methods is their greediness. They often "leak" (i.e., grow segments where they should not) in places where the boundaries between the objects are weak or blurry.

It is known to use graph cuts for image segmentation. In Wu et al., *An optimal graph theoretic approach to data clustering: Theory and its application to image segmentation*, IEEE Transactions on Pattern Analysis and Machine Intelligence, 15(11):1101–1113 (November 1993), there is disclosed a method wherein an image is optimally divided into K parts to minimize the maximum cut between the segments. In this formulation, however, the segmentation is strongly biased to very small segments. An attempt to solve this problem by normalizing the cost of a cut is disclosed in Shi et al., *Normalized cuts and image segmentation*, In IEEE Conference on Computer Vision and Pattern Recognition, pages 731–737 (1997), but the resulting optimization problem is NP-hard and they use an approximation technique.

It is also known to use graph cuts to minimize certain energy functions used in image restoration, stereo, and other early vision problems, such as is disclosed in Boykov et al., *Markov random fields with efficient approximations*, In IEEE Conference on Computer Vision and Pattern Recognition, pages 648–655 (1998); Ishikawa et al., *Segmentation by grouping junctions*, In IEEE Conference on Computer Vision and Pattern Recognition, pages 125–131 (1998); and Greig et al., *Exact maximum a posteriori estimation for binary images*, Journal of the Royal Statistical Society, Series B, 51(2):271–279 (1989).

Ideally, one would like to have a segmentation based on both region and boundary information. There are many attempts to design such methods, generally involving numerical optimization. Typical schemes use variational approaches leading to a local minimum, such as is disclosed in Zhu et al., *Region competition: Unifying snakes, region growing, and Bayes/MDL for multiband image segmentation*, IEEE Transactions on Pattern Analysis and Machine Intelligence, 18(9):884–900 (September 1996). In some special cases of combining region and boundary information, a globally optimal segmentation is possible through graph based methods, such as are disclosed in Cox et al., "*Ratio regions*": *a technique for image segmentation*, International Conference on Pattern Recognition, volume II, pages 557–564 (1996); and Jermyn et al., *Globally optimal regions and boundaries*, International Conference on Computer Vision, volume II, pages 904–910 (1999). A problem with Cox and Jermyn is that their techniques are restricted to 2-D images.

SUMMARY OF THE INVENTION

Disclosed is a method of segmenting one or more objects from one or more backgrounds in an image, the method comprising defining a plurality of image nodes, each said image node corresponding to one or more pixels of said image, connecting pairs of adjacent image nodes with n-links, each said n-link weighted with an n-link cost, defining a source node, defining a sink node, defining one or more object seeds, said object seeds corresponding to image nodes within said objects, defining one or more background seeds, said background seeds corresponding to image nodes within said backgrounds, connecting said source node with each said object seed with a plurality of t-links, connecting said sink node with each said background seed with a plurality of t-links, wherein each said t-links is weighted with a t-link cost, and calculating a segmentation cut having the smallest total cost of all cuts separating said source from said sink, wherein said total cost of each said cut is defined as the sum of the costs of all said n-links and t-links that each said cut severs.

In another aspect of the method, said n-link cost is a function of a local intensity gradient between said image nodes.

In another aspect of the method, said n-link cost is the function $f(|I_p-I_q|)$, where $I_p$ and $I_q$ are the intensities of image nodes p and q respectively and $f( )$ is a non-negative decreasing function.

In another aspect of the method, said non-negative decreasing function $f(x)=K\cdot\exp(-x^2/\sigma^2)$.

In another aspect of the method, said t-link cost between the source and the object seeds and between the sink and the background seeds is infinity.

Another aspect of the method further comprises connecting said source node with each said image node with a plurality of t-links, and connecting said sink node with each said image node with a plurality of t-links.

In another aspect of the method, said cost of each said t-link not connected to a seed is a function of the probability that the image node to which said t-link is connected belongs to predefined object and background distributions.

In another aspect of the method, additional seeds may be defined after calculation of said segmentation boundary and a new segmentation boundary recalculated.

In another aspect of the method, additional seeds are defined near a region where two objects are in contact so as to separate them upon recalculation.

In another aspect of the method, said calculation of said segmentation boundary is effected with a max-flow method.

In another aspect of the method, said calculation of said segmentation boundary is effected with a push-relabel method.

Disclosed is a program storage device readable by machine, tangibly embodying a program of instructions executable by the machine to perform method steps for segmenting one or more objects from one or more backgrounds in an image, said method steps comprising defining a plurality of image nodes, each said image node corresponding to one or more pixels of said image, connecting pairs of adjacent nodes with n-links, each said n-link weighted with an n-link cost, defining a source node, defining a sink node, defining one or more object seeds, said object seeds corresponding to image nodes within said objects, defining one or more background seeds, said background seeds corresponding to image nodes within said backgrounds, connecting said source node with each said object seed with a plurality of t-links, connecting said sink node with each said background seed with a plurality of t-links, wherein each said t-links is weighted with a t-link cost, and calculating a segmentation cut having the smallest total cost of all cuts separating said source from said sink, wherein said total cost of each said cut is defined as the sum of the costs of all said n-links and t-links that each said cut severs.

In another aspect of the apparatus, said n-link cost is a function of a local intensity gradient between said image nodes.

In another aspect of the apparatus, said n-link cost is the function $f(|I_p-I_q|)$, where $I_p$ and $I_q$ are the intensities of image nodes p and q respectively and $f( )$ is a non-negative decreasing function.

In another aspect of the apparatus, said non-negative decreasing function $f(x)=K\cdot\exp(-x^2/\sigma^2)$.

In another aspect of the apparatus, said t-link cost between the source and the object seeds and between the sink and the background seeds is infinity.

Another aspect of the apparatus further comprises connecting said source node with each said image node with a plurality of t-links, and connecting said sink node with each said image node with a plurality of t-links.

In another aspect of the apparatus, said cost of each said t-links not connected to a seed is a function of the probability that the image node to which said t-link is connected belongs to predefined object and background distributions.

In another aspect of the apparatus, additional seeds may be defined after calculation of said segmentation boundary and a new segmentation boundary recalculated.

In another aspect of the apparatus, additional seeds are defined near a region where two objects are in contact so as to separate them upon recalculation.

In another aspect of the apparatus, said calculation of said segmentation boundary is effected with a max-flow method.

In another aspect of the apparatus, said calculation of said segmentation boundary is effected with a push-relabel method.

BRIEF DESCRIPTION OF THE DRAWINGS

FIG. 2(*b*) shows the segmentation of multiple objects in a 3-D image.

FIG. 4(*b*) shows the corresponding graph.

FIG. 4(*c*) shows the minimum cut in the graph.

DETAILED DESCRIPTION OF PREFERRED EMBODIMENTS

Figure 1A:
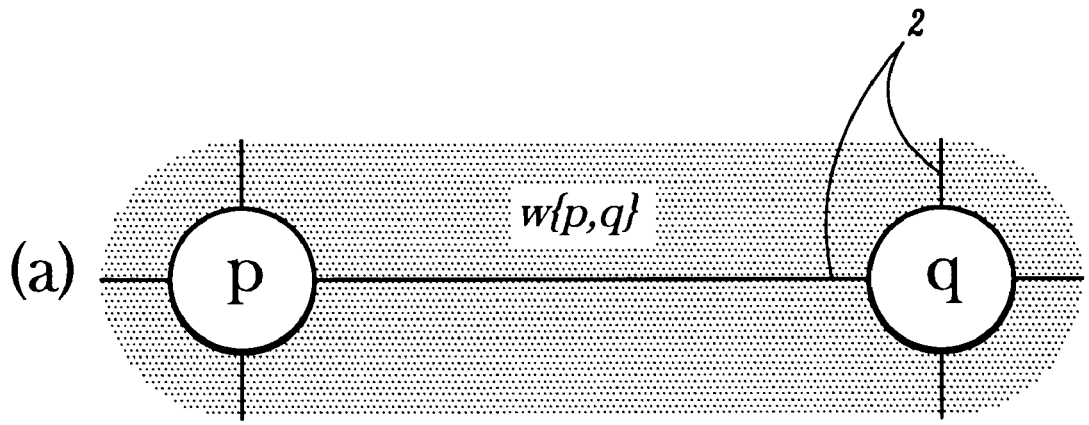
FIG. 1 shows examples of n-links for neighboring pixels.

Here we present a new method for image segmentation separating an object of interest from the background based on graph cuts. Formulating the segmentation problem as a two-terminal graph cut problem allows globally optimal efficient solution in a general N-dimensional setting. The invention has some features of both boundary and region based methods and it addresses many of their limitations. First of all, the method of the invention directly computes the segmentation boundary by minimizing its cost. The only hard constraint is that the boundary should separate the object from the background. At the same time, the invention has a strong "regional" flavor. The segmentation is initialized by certain object (and background) seeds. There is no prior model of what the boundary should look like or where it should be located. The method can be applied to images of any dimensions. It can also directly incorporate some region information. The invention strongly benefits from both "boundary" and "region" sides of its nature. The "region" side allows natural propagation of information throughout the volume of an N-dimensional image while the "boundary" side addresses the "leaks".

The method of the invention can generate one or a number of isolated segments for the object (as well as for the background). Depending on the image data the method automatically decides which seeds should be grouped inside a single object (or background) segment. The invention also allows effective interaction with a user. Initially, the object and background seeds can be specified manually, automatically, or semi-automatically. After reviewing the corresponding segmentation the user can specify additional object and background seeds depending on the observed results. To incorporate these new seeds the method can efficiently adjust the current segmentation without recomputing the whole solution from scratch.

The optimization scheme of the invention is analogous to those of Greig, supra and Boykov, supra, the disclosures of both of which are incorporated by reference herein in their entirety. The invention introduces the new concept, among others, of object/background segmentation where a cut must separate corresponding seed points. The interactive use of object and background seeds as hard constraints for the minimum graph cut problem is one of the characteristics that distinguishes the invention over the prior art.

To segment an image we create a graph with image nodes corresponding to pixels of the image. Note that pixels in three-dimensional images are referred to as "voxels" and will usually have an opacity component that is normally absent in two-dimensional pixels. Nevertheless, for simplicity, the term "pixel" in this specification also encompasses "voxel" in the 3-D context. There are two additional terminal nodes: an "object" terminal (a source) and a "background" terminal (a sink). The source is connected by edges to all image nodes identified as object seeds and the sink is connected to all background seeds. For convenience, all edges from the terminals are referred to as t-links. We assign an infinite cost to all t-links between the seeds and the terminals.

Pairs of neighboring pixels are connected by weighted edges that we call n-links (neighborhood links). Any kind of neighborhood system can be used. Some examples of n-links based on local intensity gradient magnitude are shown in FIG. 1. Other schemes of assigning cost to n-links can be based on Laplacian zero-crossing, gradient direction, and other criteria, such as are disclosed in Mortensen, supra, the disclosures of which are incorporated by reference herein in their entirety.

Figure 1B:
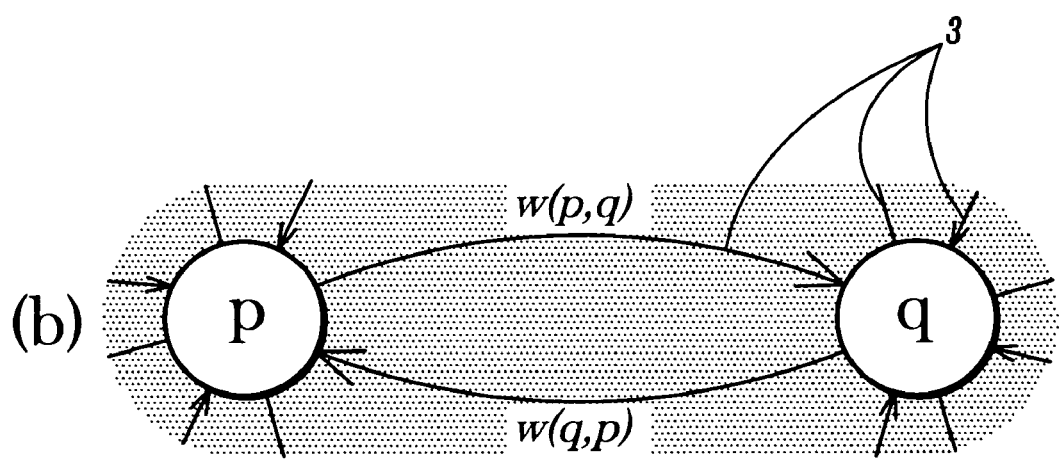

Referring more specifically to FIGS. 1a and 1b, there are depicted a pair of pixels p, q. In FIG. 1a is shown a plurality of undirected n-links 2, each having an associated cost w(p,q), which may be varied according to a local intensity gradient. For example, one may take $w(p,q)=f(|I_p-I_q|)$, where $I_p$ and $I_q$ are the intensities at points p and q and $f(\ )$ is a non-negative decreasing function, such as $f(x)=K \cdot \exp(-x^2/\sigma^2)$. Such weights encourage segmentation boundaries at high intensity gradients.

In FIG. 1b is shown directed n-links 3, useful for forcing additional constraints on segmentation. Shown, for example, is a finite cost $w(p,q)=f(|I_p-I_q|)$ for edge (p,q) and infinite cost $w(q,p)=\infty$ for edge (q,p) running in the opposite direction. Assuming the intensity of p to be greater than that of q, these n-links ensure that the segmentation boundary crossing between the brighter and darker pixels will leave the brighter pixel within the object, thereby making the scheme useful for segmenting out bright objects.

The general graph structure is now completely specified. We draw the segmentation boundary between the object and the background by finding the minimum cost cut on this graph. A cut is a subset of edges that separates the source from the sink. A cost of the cut is a sum of its edge costs. Due to the infinite cost of t-links to the seeds, a minimum cut is guaranteed to separate the object seeds from the background seeds. Note that locations with high intensity gradients correspond to cheap n-links. Thus, they are attractive for the optimal segmentation boundary. The minimum cut can be computed exactly in polynomial time using well known methods for two terminal graph cuts, e.g., "max-flow" as disclosed in Ford et al., *Flows in Networks*, Princeton University Press (1962) and Boykov and Kolomogorov, *An experimental comparison of min-cut/max-flow algorithms for energy minimization in vision*, $3^{rd}$ International Workshop on Energy Minimization Methods in Computer Vision and Pattern Recognition (EMMCVPR), Springer-Verlag (September 2001, not yet published); or "push-relabel" as disclosed in Goldberg et al., *A new approach to the maximum flow problem*, Journal of the Association for Computing Machinery, 35(4):921–940 (October 1988), the disclosures of all of which are incorporated by reference herein in their entirety.

Figure 2A:
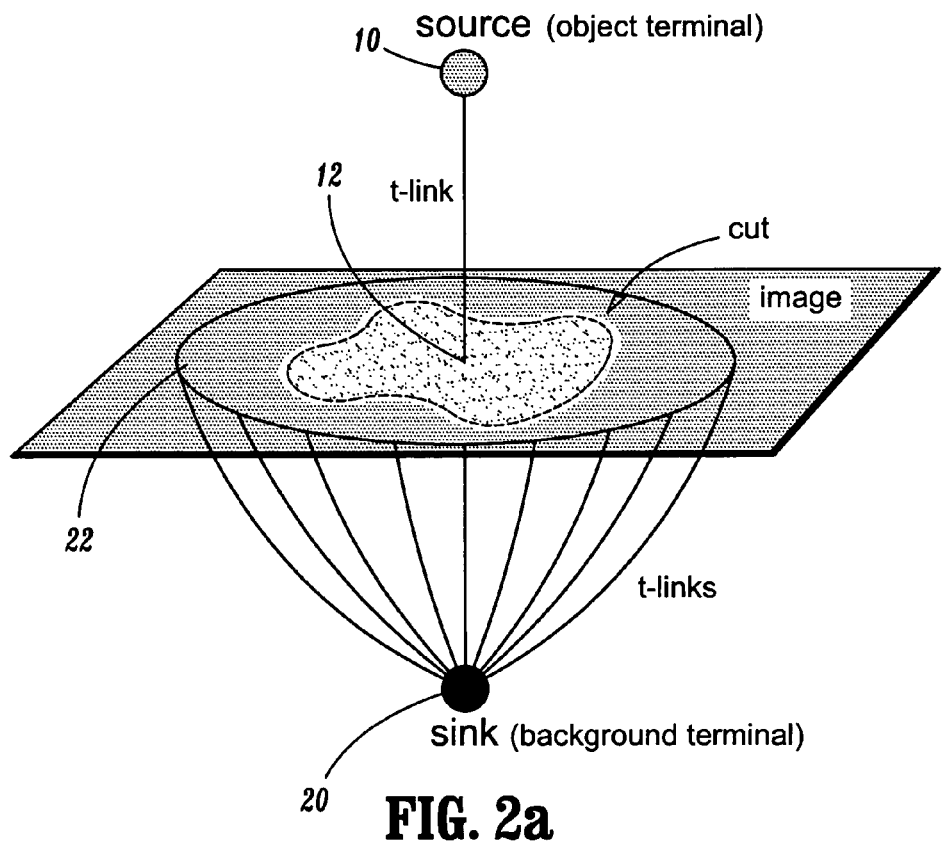
FIG. 2(*a*) shows the segmentation of a single object in a 2-D image.

Referring to FIG. 2, consider an example where the goal is to segment an object from a background in a given 2-D image. To be specific, we assume that the object appears as one connected blob of pixels brighter than the background. For simplicity, we assume that the user designates one pixel (or a few adjacent pixels) inside the bright area as an object seed(s) 12. The background seeds 22 can be spread in the darker part of the image where it is certain that they are not a part of the object. For example, the pixels at the image border can be chosen as background seeds. If the approximate size of the object is known, then background seeds 22 can be pixels on a circle of a sufficiently large radius centered at the object seed 12. The structure of the resulting graph is shown in FIG. 2(a), wherein it can be seen that all the background seed(s) are connected with t-links to the sink 20 and all the object seed(s) are similarly connected to the source 10.

The method of the invention is guaranteed to generate a single object segment when there is only one object seed or when the object seeds form one connected group. In the example of this section the minimum cut would form a single contour or boundary that separates the object seed(s)

from the background seeds as shown in FIG. 2(a). In fact, this cut will have the smallest cost among all cuts separating the object seeds 12 from the background seeds 22.

This example shows that, in a simple 2-D setting, the invention can be used to extract a single closed contour, which is what snakes, deformable templates, or shortest path search methods are used for. An advantage of the invention is that it naturally generalizes to multiple contours and to N-dimensional images where it still gives the globally optimal solution.

Figure 2B:
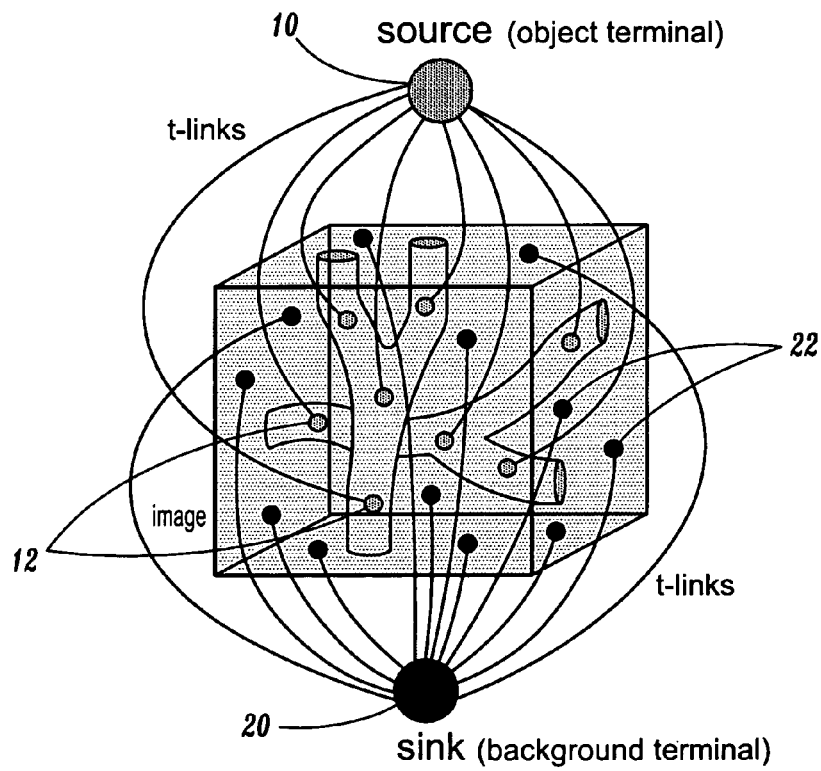

Referring to FIG. 2b, we consider the more complex case of separating out multiple objects in three dimensions. For example, an MR image may contain ten blood vessels and a doctor may want to investigate two of them. The object seeds 12 provide the necessary clues on what parts of the image are interesting to the user. There are no strict requirements on where the object seeds 12 have to be placed as long as they are inside the object(s) of interest. Such flexibility is justified, in part, by the ability of the method to efficiently incorporate the seeds added later on when the initial segmentation results are not satisfactory. The object seeds 12 can be placed sparingly and they do not have to be necessarily connected inside each isolated object. Potentially, the method can create as many separate object segments as there are connected components of object seeds 12. Nonetheless, the isolated seeds (or components of seeds) located not too far from each other inside the same object are likely to be segmented out together. The segmentation method automatically decides which object seeds are grouped into one connected segment and which seeds are placed separately. For example, this property may be useful when a user does not see how the objects of interest connect at the time of placing the seeds.

Figure 3:
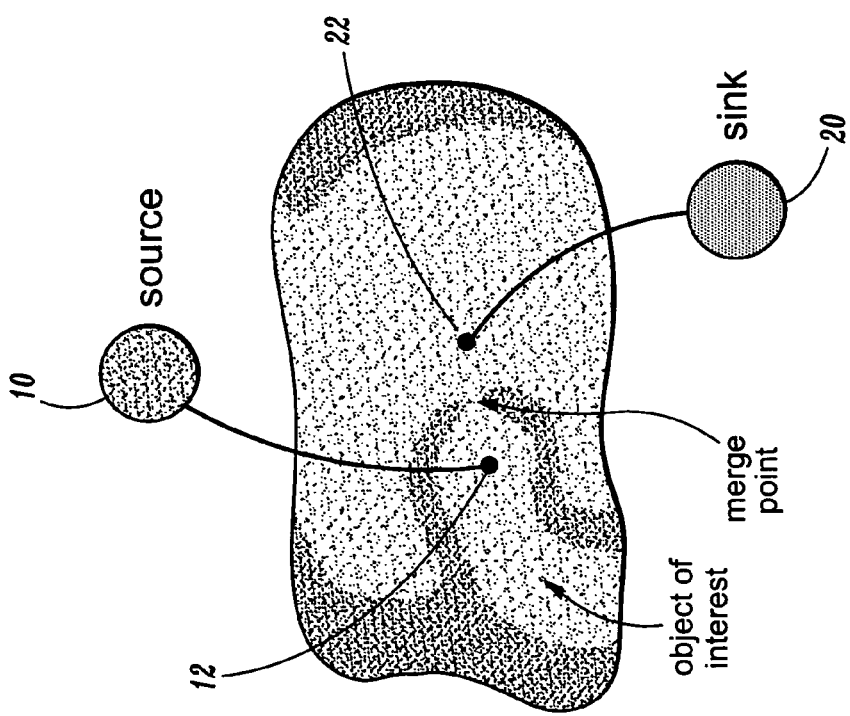
FIG. 3 shows an example of adding an extra background seed to help separate an object of interest from another contacting object.

The background seeds should provide the clues on what is not an object of interest. In many situations the pixels on the image boundary are a good choice for background seeds. If objects of interest are bright then background seeds can be spread out in the dark parts of the image. Note that background seeds are very useful when two similar objects touch at some area in the image and one of them is of interest while the other is not. In this case there is a chance that the objects may merge into a single segment. We need to separate the object of interest. To simplify the separation an object seed can be placed inside the object of interest and a background seed can be places inside the other object close to their potential merge point. One such example is shown in FIG. 3. The method will be forced to separate those two objects and the cheapest cut will be at the merge point.

An example of forcing separation between adjacent objects is shown in FIG. 3. As stated, an extra background seed can help to separate an object of interest from a similar object in cases where they touch. In this case the background seed provides an additional clue that forces the method to separate the irrelevant object. For simplicity, the drawing shows only the seeds necessary to illustrate the point.

It should be noted that an advantage of the invention is that additional object and background seeds can be placed by the user after observing the results of the current segmentation. If the results are not satisfactory at some part of the image, the user can specify new object and background seeds providing extra segmentation clues in the distorted area. The user can keep adding extra seeds interactively until all problems are corrected. It is important that the method can efficiently adjust the segmentation to incorporate any additional seeds. To be specific, assume that the max-flow method is used to compute a graph cut corresponding to an optimal segmentation. To compute a minimum cut incorporating new seeds one should add the corresponding new t-links to the final residual graph that remains after the previous cut computation. Thus, a new optimal cut can be efficiently obtained without recomputing the whole solution.

Local intensity gradients encoded in the costs of n-links is not the only type of information that can drive the segmentation method. Pixel intensities may be used directly, in addition to the gradients. Assume, for example, that we have some prior model of intensities in the object and in the background (e.g., in the form of histograms or distribution functions). For example, a distribution function for the object can be estimated using the histogram of gray levels in the pixels marked by the seeds. Also, the background can be assumed to have a known mathematical probability distribution (uniform for example). We can then connect each non-seed pixel to both the source and the sink with a new type of t-link. These t-links are assigned finite weights based on the intensity at each given pixel. A large weight is assigned to a t-link from the source (sink) to a non-seed pixel if its intensity fits well into the intensity histogram of the object (background) and a small weight otherwise.

Figure 4B:
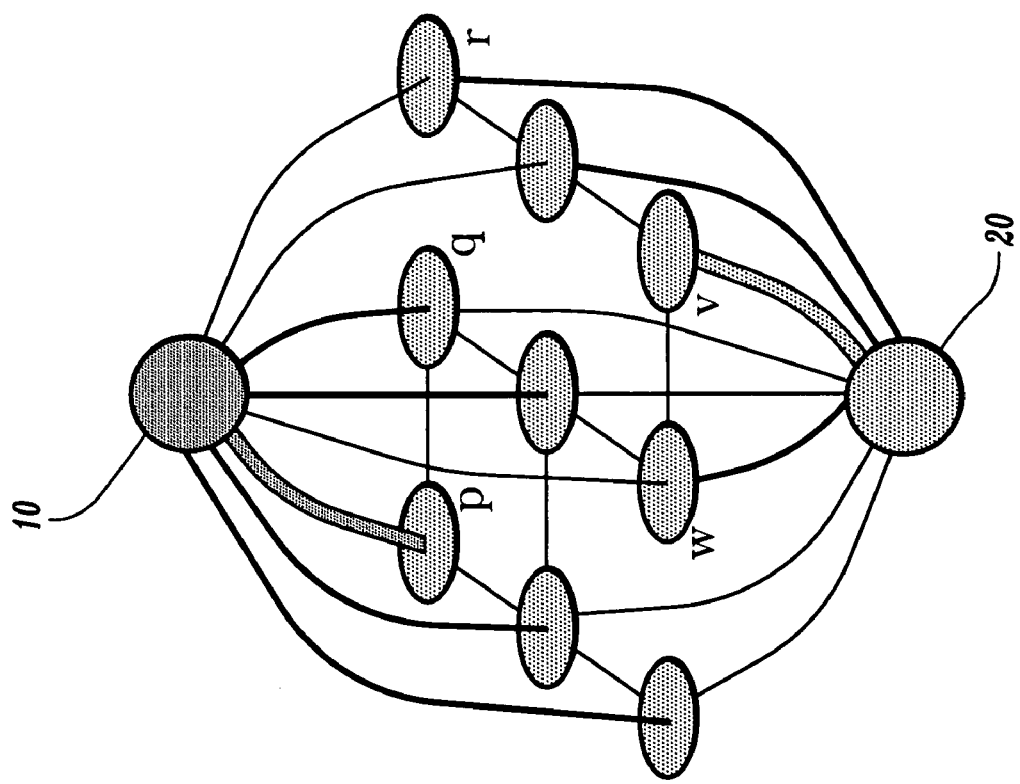
FIG. 4(*a*) shows a simple example of a 3×3 image with 2 seeds.
Figure 4A:
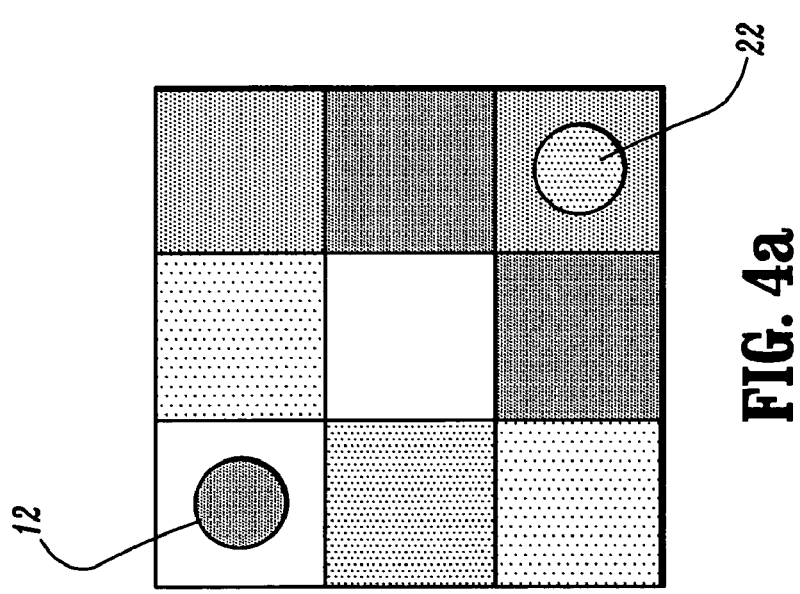
Figure 4C:
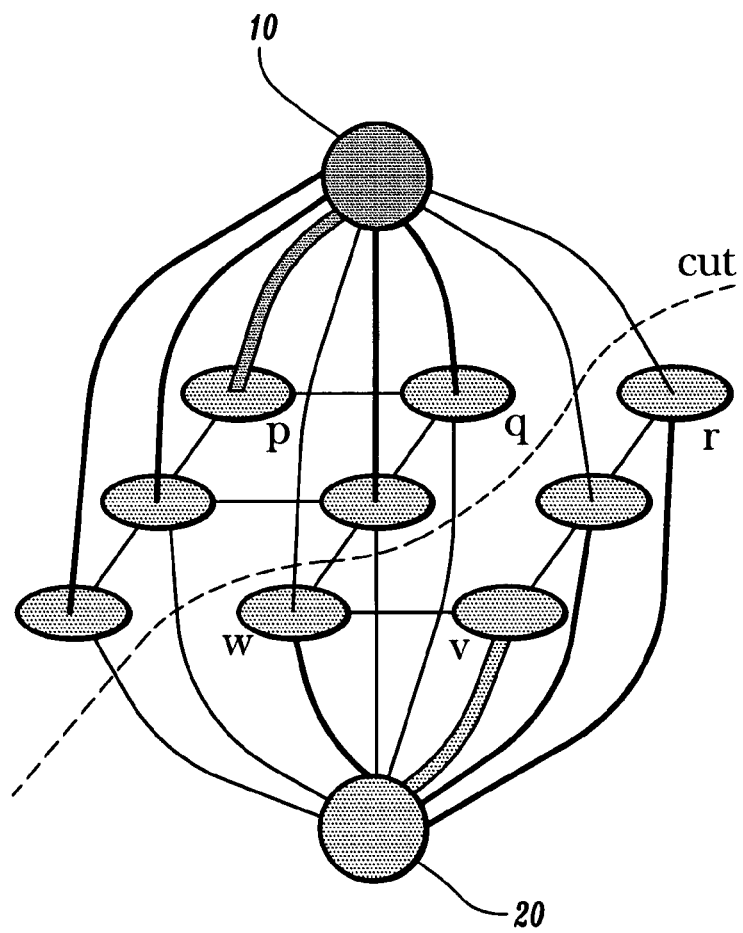

FIG. 4 shows an example with a simple 3×3 image. As shown in FIG. 4(a), two seeds 12, 22 have been placed inside an object and background regions. The corresponding graph appears in FIG. 4(b). It can be seen that pixels that most resemble the object seed 12 have stronger connections to the source node 10 (thicker links with larger weights) and pixels most resembling the background seed 22 have stronger links with the sink node 20. FIG. 4(c) shows the resulting minimum cut in the graph.

The relative weight of two t-links connecting a given non-seed pixel to the source and the sink depends on whether this pixel looks more like an object or a background pixel. These t-links are similar to the terminal links used in Boykov, supra, for a general purpose MRF labeling. Such t-links provide additional soft constraints for non-seed pixels. Note that each seed pixel is hard-wired by a single t-link to one of the terminals. The t-links to the seeds have infinite weights and, therefore, provide hard constrains for the segmentation method of the invention. Alternatively, all the t-links could provide soft constraint, meaning that all are non-infinite. The use of soft t-links is described in detail in Y Boykov & M-P. Jolly, *Interactive graph cuts for optimal boundary & region segmentation of objects in n-D images*, Proceedings of the International Conference on Computer Vision, Vancouver, Canada, vol. I, pp. 105–112 (2001), the disclosures of which are incorporated by reference herein in their entirety.

The invention is easily automated as by, for example, tangibly embodying a program of instructions upon a storage media, readable by a machine capable of executing the instructions, such as a computer.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of segmenting one or more objects from one or more backgrounds in an image, the method comprising:
   defining a plurality of image nodes, each said image node corresponding to one or more pixels of said image;
   connecting pairs of adjacent nodes with n-links, each said n-link weighted with an n-link cost;
   defining a source node;
   defining a sink node;
   defining one or more object seeds, said object seeds corresponding to image nodes within said objects;
   defining one or more background seeds, said background seeds corresponding to image nodes within said backgrounds;
   connecting said source node with each said object seed with a t-link;
   connecting said sink node with each said background seed with a t-link;
   wherein each said t-link is weighted with a t-link cost, wherein said t-link cost between the source and the object seeds and between the sink and the background seeds is infinity; and
   calculating a segmentation cut having the smallest total cost of all cuts separating said source from said sink, wherein said total cost of each said cut is defined as the sum of the costs of all said n-links and t-links that each said cut severs.

2. The method of claim 1 wherein said n-link cost is a function of a local intensity gradient between said image nodes.

3. The method of claim 2 wherein said n-link cost is the function $f(|I_p-I_q|)$, where $I_p$ and $I_q$ are the intensities of image nodes p and q respectively and $f(\ )$ is a non-negative decreasing function.

4. The method of claim 3 wherein said non-negative decreasing function $f(x)=K\cdot\exp(-x^2/\sigma^2)$.

5. The method of claim 1 further comprising:
   connecting said source node with each said image node with a t-link; and
   connecting said sink node with each said image node with a t-link.

6. The method of claim 5 wherein said cost of each said t-link not connected to a seed is a function of the probability that the image node to which said t-link is connected belongs to predefined object and background distributions.

7. The method of claim 1 wherein additional seeds may be defined after calculation of said segmentation boundary and a new segmentation boundary recalculated.

8. The method of claim 7 wherein additional seeds are defined near a region where two objects are in contact so as to separate them upon recalculation.

9. The method of claim 1 wherein said calculation of said segmentation boundary is effected with a max-flow method.

10. The method of claim 1 wherein said calculation of said segmentation boundary is effected with a push-relabel method.

11. A program storage device readable by machine, tangibly embodying a program of instructions executable by the machine to perform method steps for segmenting one or more objects from one or more backgrounds in an image, said method steps comprising:
   defining a plurality of image nodes, each said image node corresponding to one or more pixels of said image;
   connecting pairs of adjacent nodes with n-links, each said n-link weighted with an n-link cost;
   defining a source node;
   defining a sink node;
   defining one or more object seeds, said object seeds corresponding to image nodes within said objects;
   defining one or more background seeds, said background seeds corresponding to image nodes within said backgrounds;
   connecting said source node with each said object seed with a t-link;
   connecting said sink node with each said background seed with a t-link;
   wherein each said t-link is weighted with a t-link cost, wherein said t-link cost between the source and the object seeds and between the sink and the background seeds is infinity; and
   calculating a segmentation cut having the smallest total cost of all cuts separating said source from said sink, wherein said total cost of each said cut is defined as the sum of the costs of all said n-links and t-links that each said cut severs.

12. The apparatus of claim 11 wherein said n-link cost is a function of a local intensity gradient between said image nodes.

13. The apparatus of claim 12 wherein said n-link cost is the function $f(|I_p-I_q|)$, where $I_p$ and $I_q$ are the intensities of image nodes p and q respectively and $f(\ )$ is a non-negative decreasing function.

14. The apparatus of claim 13 wherein said non-negative decreasing function $f(x)=K\cdot\exp(-x^2/\sigma^2)$.

15. The apparatus of claim 11 further comprising:
   connecting said source node with each said image node with a t-link; and
   connecting said sink node with each said image node with a t-link.

16. The apparatus of claim 15 wherein said cost of each said t-link not connected to a seed is a function of the probability that the image node to which said t-link is connected belongs to predefined object and background distributions.

17. The apparatus of claim 11 wherein additional seeds may be defined after calculation of said segmentation boundary and a new segmentation boundary recalculated.

18. The apparatus of claim 17 wherein additional seeds are defined near a region where two objects are in contact so as to separate them upon recalculation.

19. The apparatus of claim 11 wherein said calculation of said segmentation boundary is effected with a max-flow method.

20. The apparatus of claim 11 wherein said calculation of said segmentation boundary is effected with a push-relabel method.

* * * * *